UNITED STATES PATENT OFFICE.

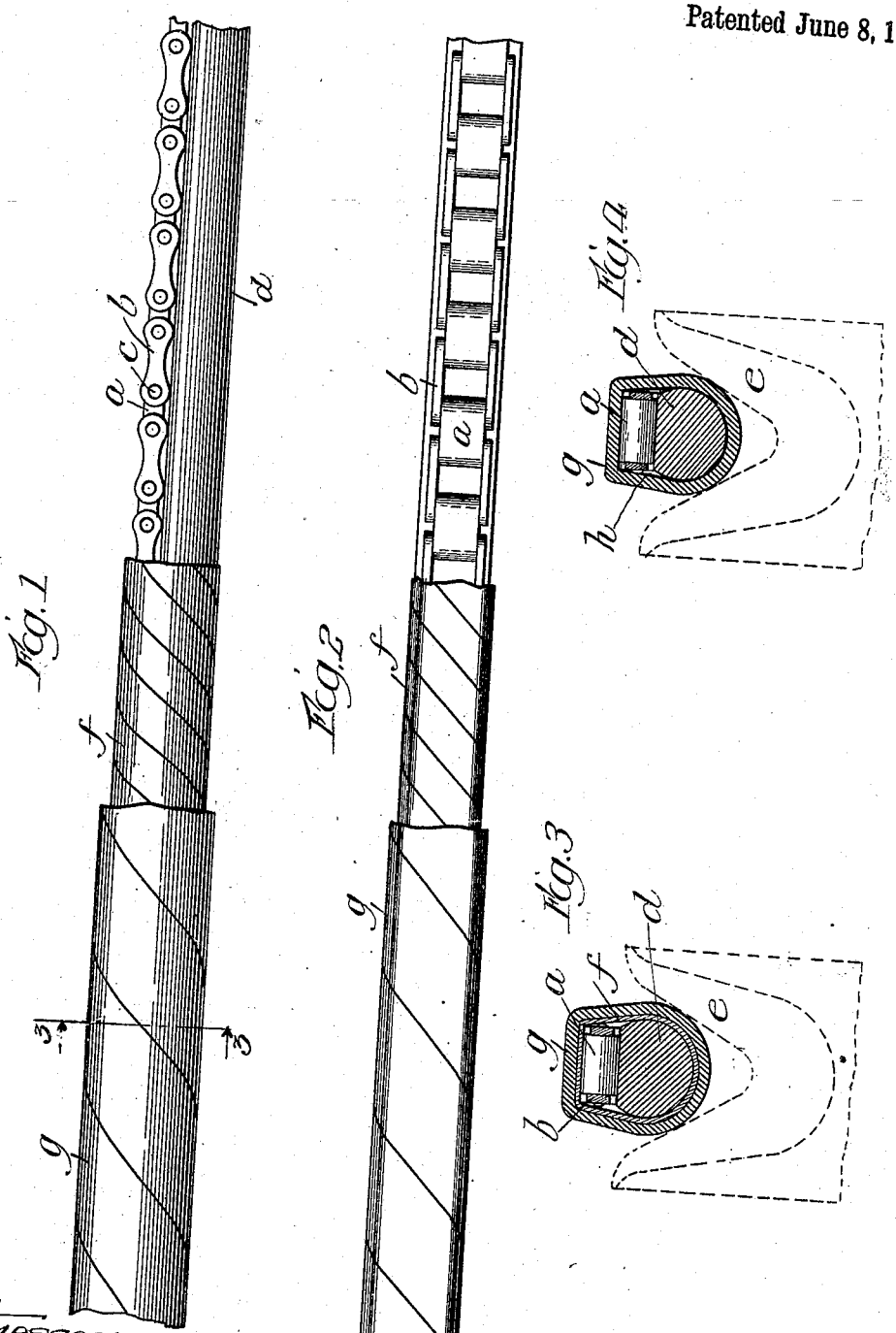

CLARENCE H. BRYAN, OF CHICAGO, ILLINOIS.

CHAIN ROPE.

No. 924,313.      Specification of Letters Patent.      Patented June 8, 1909.

Application filed January 22, 1909. Serial No. 473,720.

*To all whom it may concern:*

Be it known that I, CLARENCE H. BRYAN, a citizen of the United States, and a resident of Chicago, in the county of Cook and State of Illinois, have invented certain new and useful Improvements in Chain Ropes, of which the following is a full, clear, and exact specification.

My invention is concerned with a novel chain rope, which I have devised to coöperate with sheaves for power transmission purposes generally, and more especially for use in automobiles having friction rope transmission, where power is applied through the rope from a small driving sheave to a large one. For such use, it is essential to have a rope with the strength of a chain, with at least the elasticity of a rope for its sheave engaging surface, preferably one that shall be flexible in one plane only and that shall not be affected by moisture. To this end I have devised a novel chain rope, to illustrate which I annex hereto a sheet of drawings, in which the same reference characters are used to designate identical parts in the figures, of which, Figure 1 is a side elevation of the rope with parts broken away to illustrate the construction thereof; Fig. 2 is a similar view of the rope seen from the top; Fig. 3 is a section through the rope, with the coöperating sheave in dotted lines, and Fig. 4 is a similar view illustrating a slight modification.

The basis of my improved rope is a chain, which is preferably a block chain, and may be a sprocket chain. It is made up of blocks $a$ and connecting links $b$, which are secured by pivots $c$ in the customary manner, and, as is well known, forms a chain which is extremely strong, and flexible in the plane of the sheaves with which it coöperates, and one that is incapable of lateral flexure, a feature which is of value in a driving rope, as it tends to prevent the rope being displaced laterally and consequently getting out of the groove of the sheave when the tension is released. To form a suitable cushion on the side of the rope which engages the sheave, I employ a strip of solid rubber $d$, which is preferably substantially circular in cross section, and in the outer surface of which the chain becomes embedded to a certain extent as the two parts are bound together. This solid rubber strip produces an elastic cushioning surface which can accommodate itself to the shape of the groove in the sheave, which may be V-shaped, as seen in the section $e$, shown in dotted lines in Figs. 3 and 4, or U-shaped, if preferred, and the rubber can be compressed into the groove to secure an uncommonly firm engagement therewith, and, consequently, a very efficient traction. The chain and rubber are secured together, preferably by a band of adhesive tape $f$, which is wound about them in helical spires and serves to hold them from relative displacement. A suitable exterior covering $g$ is employed, which preferably consists of a single strip of belting wound helically about the chain and rubber strip, so as to enable it to yield, compressing on the concave side and expanding on the convex side as is necessary in passing around the small sheave.

In Fig. 4 I have shown a slight modification, in which the adhesive tape $f$ is omitted and the interior of the cover $g$ is provided with a heavy coat $h$ of soft rubber or some similar adhesive to assist the cover in holding the chain and rubber strip in their proper relationship.

It will be noted that with the body of soft rubber compressed between the chain and the bottom of the sheave by the pull on the chain, the tendency is to increase the width of the rubber, thus causing it to grip the sides of the sheave firmly and increasing the traction. When the chain leaves the sheave, the pressure on the rubber is released and it resumes its normal shape, thus causing it to let go of the sheave readily. By this construction of interposing a considerable body of soft elastic material between the sheave and the inelastic chain, I believe I have produced the most perfect traction possible in a rope drive. While I have described the strip as composed of soft rubber, it will be understood that I desire to cover any equivalent material, if employed in the same manner and for the same purpose.

While I have shown and described my invention as embodied in the form which I at present consider best adapted to carry out its purposes, it will be understood that it is capable of modification, and that I do not desire to be limited in the interpretation of the following claims, except as may be necessitated by the state of the prior art.

What I claim as new, and desire to secure by Letters Patent of the United States is:

1. A chain rope, consisting of a chain flexible in one plane only, a cushioning body of soft rubber on the engaging side in the plane of flexure adapted to have its width increased by the pressure of the chain thereon, means for securing the cushioning body on the chain, and a cover surrounding the chain and body.

2. A chain rope, consisting of a chain, a cushioning body of soft rubber, substantially circular in cross section, on the engaging side in the plane of flexure and adapted to have its width increased by the pressure of the chain thereon, means for securing the cushioning body on the chain, and a cover surrounding the chain and body.

3. A chain rope, consisting of a chain, a cushioning body of soft rubber on the engaging side in the plane of flexure and adapted to have its width increased by the pressure of the chain thereon, means for securing the cushioning body on the chain, and a cover surrounding the chain and body.

4. A chain rope, consisting of a chain flexible in one plane only, a cushioning body of soft rubber on the engaging side in the plane of flexure and adapted to have its width increased by the pressure of the chain thereon, and a cover surrounding the chain and body.

5. A chain rope, consisting of a chain flexible in one plane only, a cushioning strip of rubber on the engaging side in the plane of flexure, an adhesive tape wound helically about the strip and chain, and a cover surrounding the tape.

6. A chain rope, consisting of a chain, a cushioning strip of rubber, substantially circular in cross section, on the engaging side in the plane of flexure, an adhesive tape wound helically about the chain and strip, and a cover surrounding the tape.

7. A chain rope, consisting of a chain flexible in one plane only, a cushioning strip of rubber, substantially circular in cross section, on the engaging side in the plane of flexure, an adhesive tape wound helically about the strip and the chain, and a cover surrounding the tape.

In witness whereof, I have hereunto set my hand, and affixed my seal, this fourteenth day of January, A. D. 1909.

CLARENCE H. BRYAN. [L. S.]

Witnesses:
 JOHN HOWARD MCELROY,
 F. E. BROM.